June 10, 1930. T. H. OPPENHEIM ET AL 1,762,885
FEED TABLE
Filed Aug. 3, 1927 3 Sheets-Sheet 2
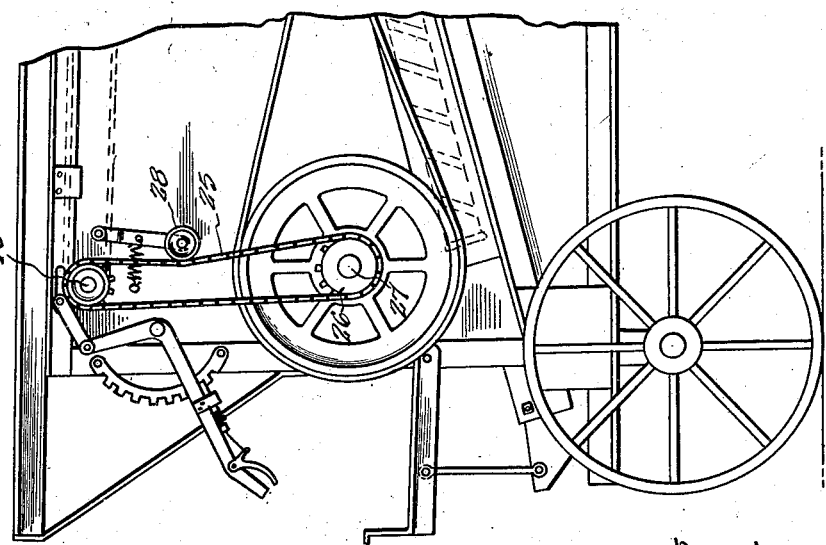
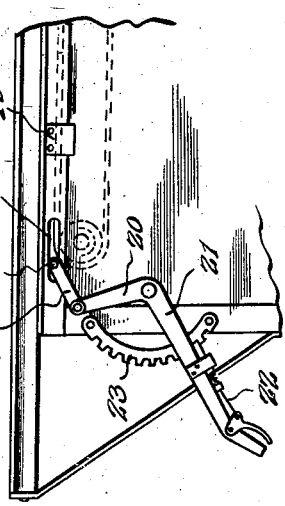
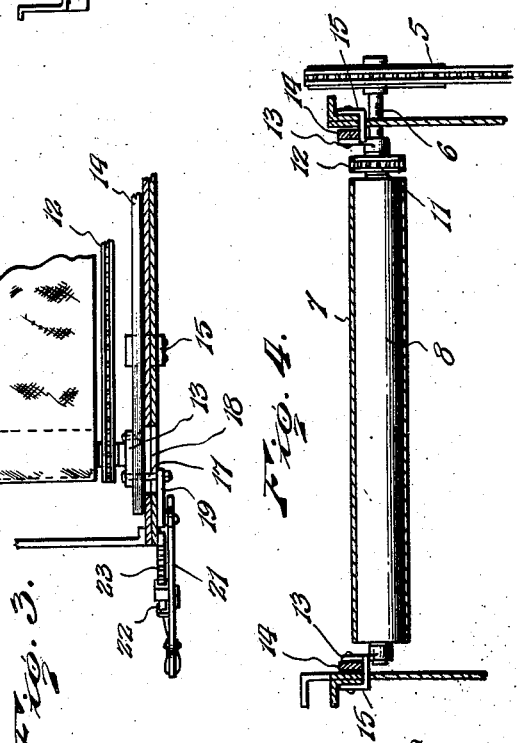
Inventors
T. H. Oppenheim.
B. Seihorst.
By Lacey & Lacey, Attorneys

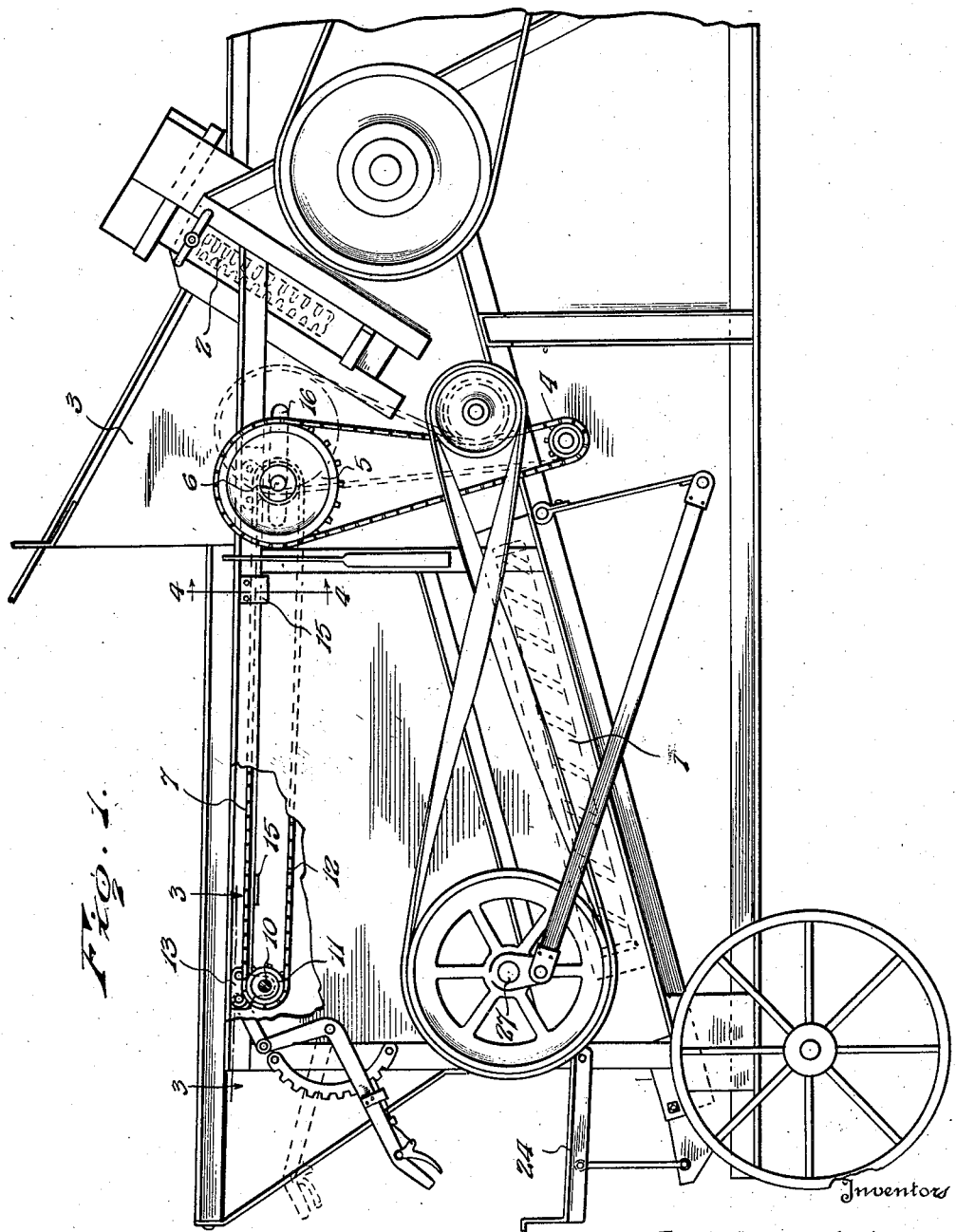

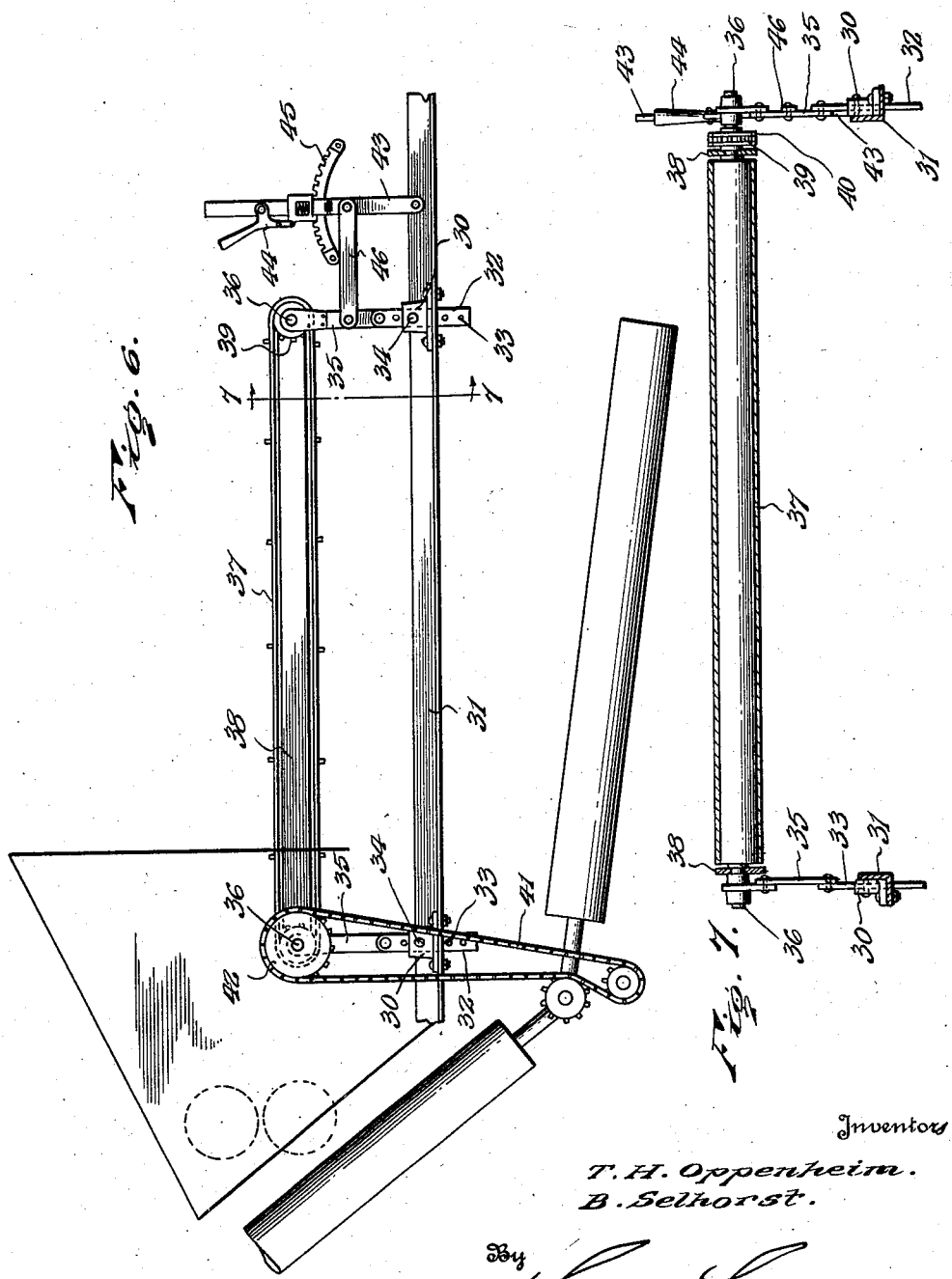

Patented June 10, 1930

1,762,885

UNITED STATES PATENT OFFICE

THEODORE H. OPPENHEIM AND BERNARD SELHORST, OF COLDWATER, OHIO, ASSIGNORS TO THE NEW IDEA SPREADER CO., OF COLDWATER, OHIO, A CORPORATION OF OHIO

FEED TABLE

Application filed August 3, 1927. Serial No. 210,362.

This invention relates to the means for feeding material to working elements which are intended to operate upon the material and has special reference to the traveling belts whereby corn stalks are fed to the snapping rolls of corn-husking machines. The object of the invention is to provide simple mechanism whereby the feeding table or belt may be shifted toward and from the snapping rolls of the machine so as to accommodate corn stalks and ears of different lengths and also to assist in clearing the rolls and the hopper of any excessive accumulations. The invention is illustrated in the accompanying drawings and will be hereinafter fully set forth.

In the drawings:

Figure 1 is a side elevation, partly broken away, of a portion of a corn-husking machine showing one embodiment of the invention applied thereto;

Fig. 2 is a detail elevation of the rear end portion of the machine more particularly showing the connections whereby the feeding belt or table is shifted;

Fig. 3 is a horizontal section on the line 3—3 of Fig. 1;

Fig. 4 is a transverse section on the line 4—4 of Fig. 1;

Fig. 5 is an enlarged elevation of the rear portion of the machine showing a somewhat different arrangement of the invention from that shown in Fig. 1;

Fig. 6 is an elevation showing a further embodiment of the invention, and

Fig. 7 is a transverse section on the line 7—7 of Fig. 6.

The husking machine is illustrated in a more or less conventional manner and embodies husking rolls, indicated at 1, and snapping rolls, indicated at 2, a hopper 3 being mounted upon the top of the machine in advance of the snapping rolls to guide the corn stalks to the rolls. In Fig. 1, the machine is illustrated as having sprocket gearing 4 mounted upon one side and including a sprocket wheel 5 secured upon the shaft 6 which carries the rear drum or roller of the feeding table or apron or belt 7. The feeding belt is carried by a rear drum or roller 8 fixed upon the shaft 6 and by a front drum or roller 9 carried by a shaft 10, each of said shafts having a sprocket pinion 11 thereon about which is trained an endless chain 12 whereby the rollers or drums 8 and 9 will be caused to rotate in unison. The shafts are rotatably mounted in brackets 13 secured to the inner sides of side bars or rails 14 which are slidably supported upon angle brackets 15 secured to an upper frame bar of the husking machine and projecting inwardly through openings in the machine casing or frame as will be understood upon reference to Fig. 4, the rails 14 obviously maintaining the bearing brackets in fixed spaced relation. The rear shaft 6 passes through a longitudinal slot 16 in one side plate of the machine while the front shaft 10 terminates at the brackets 13, a pin or bolt 17, however, being secured in one bracket and projecting outwardly therefrom through the adjacent rail 14 and through a longitudinal slot 18 in the side of the machine frame. Upon the outer end of the pin or bolt 17 is pivoted one end of a link 19 which extends forwardly and has its front end pivoted to the upstanding shorter arm 20 of an angle hand lever 21 which is fulcrumed upon the machine frame and is equipped with a latch 22 cooperating with a holding rack 23 in an obvious manner.

In the operation of the machine, the belt 7 travels continuously to convey the stalks into the hopper 3 and to the snapping rolls. It sometimes happens that the stalks are fed unevenly or other causes act to create an accumulation of the stalks in the hopper so that the operation of the snapping rolls is clogged. Under these circumstances, the operator, who is positioned upon a platform 24 at the front end of the machine, rocks the hand lever 21 and thereby imparts a longitudinal bodily movement to the feeding belt as a unit so that the space between the belt and the snapping rolls is increased and the corn stalks thereby permitted to pass more freely to the rolls so that the clogging is overcome. It frequently happens that after the machine has been operating upon corn stalks of one length it is desired to work upon stalks of greater or less length with correspondingly longer or shorter ears, and with the machines now generally constructed no provision is made to accommodate this variance in the length of the stalks and ears. With our present machine, however, the belt can be shifted body as a unit longitudinally of the machine so that its delivery end will be closer to or farther from the snapping rolls and the opening or space for the passage of stalks and ears thus made larger or smaller according to the size of the ears and stalks. The opening may be regulated for dry or frozen stalks. It will be obvious that this unitary adjustment of the feeding belt is accomplished without stopping the operation of the belt. In Fig. 1, we have shown the belt as driven at its rear end or the end nearer the snapping rolls. We contemplate, however, driving the belt at the front end of the machine, and to accomplish this result it is necessary merely to provide sprocket gearing, indicated at 25 in Fig. 5, which will connect the front shaft 10 with a sprocket pinion 26 upon the fan shaft 27 of the machine. In this arrangement, it is found desirable to provide a belt tightener 28 on the side of the machine bearing constantly against the chain of the gearing, as illustrated.

There is also comprehended within the invention an arrangement whereby the feeding belt may be adjusted vertically as well as horizontally. In Figs. 6 and 7, we have illustrated such an arrangement wherein boxes 30 are secured upon a frame bar or beam 31 of the machine, and in these boxes are fitted posts 32 provided with series of openings 33 therethrough. Mounted in the sides of the boxes 30 are pins or bolts 34 which are engageable in selected openings 33 whereby the posts may be set at any desired height with respect to the frame bar 31. Pivotally attached to the upper end of each post is a supporting arm 35 carrying at its upper end one end of a drum shaft 36, it being understood that these posts and supporting arms are duplicated at the two sides of the machine and that the shafts 36 extend across and carry drums over which are trained the feeding belt 37. Side bars or rails 38 are fitted to and extend between the shafts 36 so as to maintain them in fixed spaced relation and resist the tendency of the feeding belt to sag under the weight imposed thereon. Sprockets 39 are secured upon the shafts 36 and an endless chain 40 is trained around the said sprockets so that the shafts and drums will rotate in unison, and motion is imparted to the drums and the feeding belt by sprocket gearing, indicated at 41, which includes a gear 42 secured upon the rear shaft 36. A hand lever 43 is pivoted at its lower end upon the frame bar 31 and is equipped with a latch 44 cooperating with a holding rack 45 on the side of the machine in an obvious manner, a link 46 being pivoted to and connecting the hand lever and the adjacent arm 35, as clearly shown in Fig. 6. The hand lever and the parts cooperating therewith are mounted adjacent the front end of the machine where the lever may be easily reached by the operator, and while we have shown the driving gearing as arranged to operate at the rear end of the belt, it may be disposed to actuate the belt at its front end, as will be understood. The arrangement just described obviously provides for a vertical adjustment of the feeding belt as well as a horizontal adjustment thereof. It may be noted that with some constructions it is desirable to invert the illustrated arrangement so that the feeding belt will be supported in hangers corresponding to the posts 33 and the supporting arms 35 and such inversion of the mechanism is to be considered within the scope of the invention, and it is to be understood that the particular position of the snapping rolls is immaterial.

It is also to be understood that, while the invention has been herein disclosed with particular reference to a corn-husking machine, it is not limited to such machines but is applicable to all machines, such as threshing machines, in which it may be desirable at times to vary the distance between the feed table and the working elements.

Having thus described the invention, we claim:

The combination of a support including parallel side members, a hopper on the support, brackets secured to and projecting inwardly from said side members, rails slidably resting on said brackets at the inner sides of the side members, drums mounted at and extending between the corresponding ends of the rails, an endless feed belt having its bights disposed around the respective drums, means for actuating the belt, and means connected to one of the rails for shifting the same endwise upon the brackets and adjusting the feed belt to and from the hopper.

In testimony whereof we affix our signatures.

THEODORE H. OPPENHEIM. [L. S.]
BERNARD SELHORST. [L. S.]